United States Patent
Yan et al.

(10) Patent No.: US 7,760,960 B2
(45) Date of Patent: Jul. 20, 2010

(54) LOCALIZED CONTENT ADAPTIVE FILTER FOR LOW POWER SCALABLE IMAGE PROCESSING

(75) Inventors: Yong Yan, Austin, TX (US); Zhongli He, Austin, TX (US); Yolanda Prieto, Miami, FL (US)

(73) Assignee: Freescale Semiconductor, Inc., Austin, TX (US)

( * ) Notice: Subject to any disclaimer, the term of this patent is extended or adjusted under 35 U.S.C. 154(b) by 978 days.

(21) Appl. No.: 11/532,327

(22) Filed: Sep. 15, 2006

(65) Prior Publication Data

US 2008/0069469 A1    Mar. 20, 2008

(51) Int. Cl.
G06K 9/36 (2006.01)
G06K 9/40 (2006.01)
G06K 9/46 (2006.01)

(52) U.S. Cl. .................................. 382/261; 382/232
(58) Field of Classification Search ............ 382/172, 382/173, 210, 218, 232, 233, 240, 254, 260–264, 382/275; 375/240.03, 240.08, 240.11, 240.12, 375/240.21, 240.24; 348/208.99, 618; 345/587
See application file for complete search history.

(56) References Cited

U.S. PATENT DOCUMENTS

| | | | |
|---|---|---|---|
| 4,198,612 A * | 4/1980 | Morton | 333/17.1 |
| 4,472,733 A * | 9/1984 | Bolger | 348/618 |
| 4,928,258 A * | 5/1990 | May | 708/320 |
| 5,097,221 A * | 3/1992 | Miller | 329/318 |
| 5,510,834 A * | 4/1996 | Weiss et al. | 348/97 |
| 5,793,801 A * | 8/1998 | Fertner | 375/219 |
| 5,924,980 A * | 7/1999 | Coetzee | 600/300 |
| 6,055,318 A * | 4/2000 | Whitecar | 381/94.2 |

(Continued)

FOREIGN PATENT DOCUMENTS

WO    2006043772 A1    4/2006

OTHER PUBLICATIONS

Marek Domanski, Lukasz Blaszak, Slawomir Mackowiak, AVC Video Coders with Spatial and Temporal Scalability, Poznan University of Technology, Institute of Electronics and Telecommunications, Poznan, Poland, 2003.
Giovanni Ramponi, Warped Distance for Space-Variant Linear Image Interpolation, IEEE Transactions on Image Processing, vol. 8, No. 5, May 1999.

(Continued)

*Primary Examiner*—Amir Alavi
(74) *Attorney, Agent, or Firm*—Gary R. Stanford

(57) ABSTRACT

A localized content adaptive filter system including a tile buffer having an output providing first image information, a frequency analyzer providing a frequency information signal based on frequency content of the first image information, and an adaptive filter which is adjusted based on the frequency information signal. The frequency analyzer may include a wavelet transform filter and a frequency content analyzer. The adaptive filter may include filter select logic which receives the frequency information signal and second image information associated with the first image information, and which provides filtered image information. The filter select logic determines a filter based on the frequency information signal and the determined filter filters the second image information to provide the filtered image information. The filter select logic may include preconfigured filters in which a filter is selected by the frequency information, or a programmable filter which is programmed according to the frequency information.

24 Claims, 4 Drawing Sheets

U.S. PATENT DOCUMENTS

| | | | |
|---|---|---|---|
| 6,823,086 B1 * | 11/2004 | Dolazza | 382/261 |
| 6,873,655 B2 | 3/2005 | Comer et al. | |
| 6,925,209 B2 * | 8/2005 | Boliek et al. | 382/239 |
| 2005/0084012 A1 | 4/2005 | Hsu et al. | |
| 2006/0038823 A1 | 2/2006 | Arcas | |
| 2006/0110062 A1 * | 5/2006 | Chiang et al. | 382/260 |
| 2006/0174236 A1 | 8/2006 | Stein et al. | |
| 2007/0291127 A1 * | 12/2007 | Prieto et al. | 348/208.99 |
| 2008/0069469 A1 * | 3/2008 | Yan et al. | 382/261 |

OTHER PUBLICATIONS

Stephen K. Park, and Robert A Schowengerdt, Image Reconstruction by Parametric Cubic Convolution, Office of Arid Lands Studies and Electrical Engineering Department, University of Arizona.
International Search Report and Written Opinion, 2008.

* cited by examiner

LOCALIZED CONTENT ADAPTIVE FILTER FOR LOW POWER SCALABLE IMAGE PROCESSING

BACKGROUND OF THE INVENTION

1. Field of the Invention

The present invention relates in general to scalable image processing, and more specifically to a localized content adaptive system and method for selecting or programming re-sampling low-pass filters for low power multiple rate scalable image processing.

2. Description of the Related Art

The Advanced Video Coding (AVC) standard, Part 10 of MPEG4 (Motion Picture Experts Group), otherwise known as H.264, includes advanced compression techniques that were developed to enable transmission of video signals at a wide range of bit rates or to enable improved video quality at a given transmission rate. The newer H.264 standard outperforms video compression techniques of prior standards in order to support higher quality video at given bit rates and to enable internet-based video and wireless applications and the like. The standard defines the syntax of the encoded video bit stream along with a method of decoding the bit stream. Scalable Video Coding (SVC) is an extension of the H.264 which addresses coding schemes for reliably delivery of video to diverse clients over heterogeneous networks using available system resources, particularly in scenarios where the downstream client capabilities, system resources, and network conditions are not known in advance, or dynamically changing from time to time.

SVC achieves scalability by using base and enhanced layers concept, where an enhanced layer, or upper layer, is scalable from a lower layer, e.g., a base layer. Whereas H.264 has relatively limited scalability, SVC provides multiple levels of scalability including temporal scalability, spatial scalability, complexity scalability and quality scalability. The base layer should be the simplest form in quality, spatial resolution and temporal resolution. Temporal scalability generally refers to the number of frames per second (fps) of the video stream, such as 7.5 fps, 15 fps, 30 fps, etc. Spatial scalability refers to the resolution of each frame, such as common interface format (CIF) with 352 by 288 pixels per frame, or quarter CIF (QCIF) with 176 by 144 pixels per frame, although other spatial resolutions are contemplated, such as 4CIF, QVGA, VGA, SVGA, D1, HDTV, etc. Complexity scalability generally refers to the various computational capabilities and processing power of the devices processing the video information. Quality scalability refers to various bitrates, such as quantization levels, and is generally measured with a peak signal-to-noise (PSNR) metric versus bitrate defining the relative quality of a reconstructed image compared with an original image. The present disclosure primarily concerns an adaptive filtering system used during up and down sampling for spatial scalability.

Up and down sampling of an image signal is a common function performed in image communication systems including video systems. The up and down sampling functions incorporate a low pass filter function, which tends to blur an image or video frame. It is desired to preserve the sharpness of each image or video frame. In the current development process for SVC, up and down sampling of a video frame or a macroblock is used for inter-layer texture predictions. Two fixed length FIR filters are used in the encoder and decoder of the Joint Scalable Verification Model (JSVM). Fixed length filters, however, may result in suboptimal performance in anti-aliasing and anti-imaging for down and up sampling due to the variations of characteristics in frequency, spatial and time domain of such two-dimensional signals. Longer filter taps results in additional power consumption and memory requirements.

It is desired to provide an adaptive filter for balancing the tradeoff between visual quality, power and memory consumption for image processing.

BRIEF DESCRIPTION OF THE DRAWINGS

The benefits, features, and advantages of the present invention will become better understood with regard to the following description, and accompanying drawings where.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present disclosure is not intended to be limited to the particular embodiments shown and described herein, but is to be accorded the widest scope consistent with the principles and novel features herein disclosed. Although the present disclosure is illustrated using video processing embodiments for processing video information, such as MPEG (Motion Picture Experts Group) type video information, the present disclosure applies in general to the processing of any image information or sequential image information, such as JPEG (Joint Photographic Experts Group) information, motion JPEG (MJPEG) information, JPEG2000 information, motion JPEG2000 (MJPEG2000)

information, etc. The term "image information" as used herein is intended to apply to any video or image or image sequence information.

Figure 1:
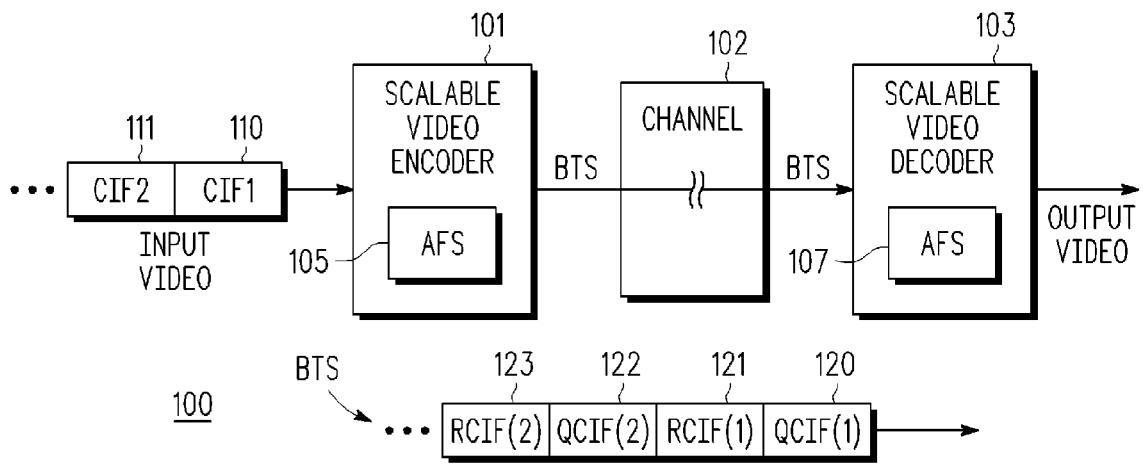
FIG. 1 is a simplified block diagram of a scalable video system implemented according to an exemplary embodiment of the present invention illustrating spatial scalability.

FIG. 1 is a simplified block diagram of a scalable video system 100 implemented according to an exemplary embodiment of the present invention illustrating spatial scalability. The video system 100 may incorporate other scalabilities, such as temporal scalability, complexity scalability, quality scalability, etc. The scalable video system 100 includes a scalable video encoder 101 and a scalable video decoder 103. The video encoder 101 encodes input video and encapsulates the encoded video information into a bitstream (BTS). The BTS is provided via channel 102 to the video decoder 103, which provides output video. The channel 102 may be any media or medium, and wireless communications are contemplated. In the configuration illustrated, the scalable video system 100 is a two layer system in which the input video is provided at a common interface format (CIF) spatial layer and in which the BTS incorporates both CIF and quarter CIF (QCIF) video information. The input video is provided as blocks of CIF information, shown from right to left as CIF1 block 110, CIF2 block 111, etc. As shown, the BTS includes, from right to left, a first encoded QCIF block, QCIF(1) block 120, followed by an encoded residual CIF block, RCIF(1) block 121, which is followed by a second encoded QCIF block, QCIF(2) block 122, followed by a second residual CIF block, RCIF(2) block 123, and so on. In this manner, the video decoder 103 receives sufficient information for decoding the BTS and providing output video with spatial layers at QCIF or CIF. Although the scalable video system 100 illustrates only two layers, the present invention is not limited to any particular number of scalable layers or input resolutions.

As known to those skilled in the art, each video frame is subdivided into one or more slices and encoded at the macroblock (MB) level, where each MB is a 16×16 block of pixels. The size of each slice is arbitrary and may range between a single MB up to all of the MBs in the frame. The relative size of each block encoded within in the BTS may also range from a single MB up to an entire frame. As described further below, the video encoder 101 incorporates an adaptive filter system (AFS) 105 for facilitating up and down sampling during the encoding process and the video decoder 103 incorporates another AFS 107 for facilitating up sampling during the decoding process. Down sampling is not used in the video decoder 103 since the QCIF information may be decoded directly whereas the CIF layer is achieved by up sampling the QCIF information and adding to decoded residual CIF information as described further below. A two layer system is illustrated for purposes of clarity of explanation, where it is understood that the present invention applies to any multiple level system including two or more spatial levels. The BTS typically includes encoded information for the selected base layer and residual information for higher layers.

Figure 2:
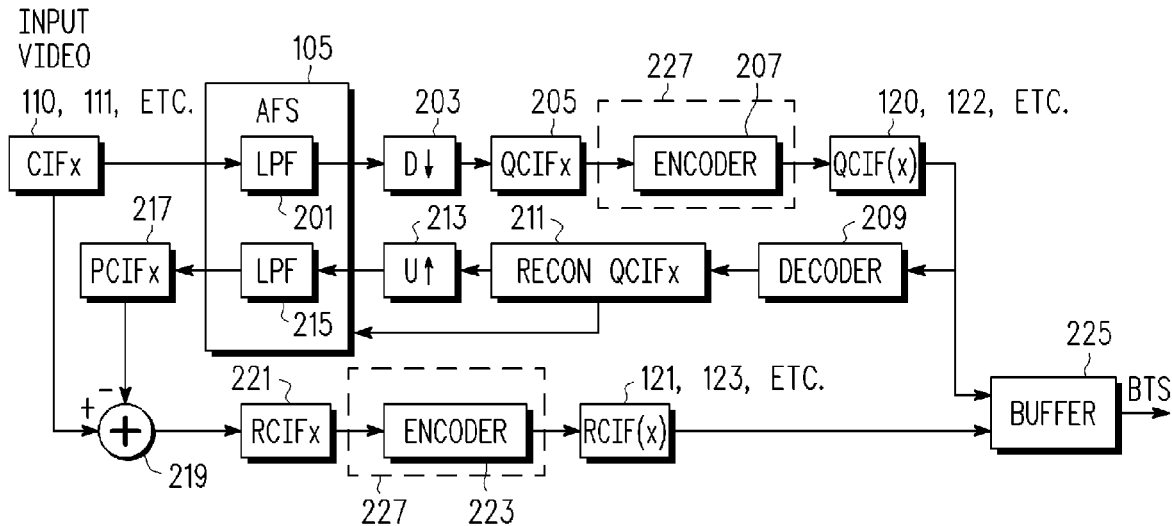
FIG. 2 is a figurative block diagram illustrating the up and down sampling process performed by the video encoder of FIG. 1.

FIG. 2 is a figurative block diagram illustrating the up and down sampling process performed by the video encoder 101. The CIFx blocks from the video input (in which "x" denotes the block number of the input video including CIF1 block 110, CIF2 block 111, etc.) are provided to a low-pass filter (LPF) 201 configured by or within the AFS 105, where the output of the LPF 201 is provided to an input of a down sampler 203. The down sampler 203 performs decimation in which it selectively accepts or rejects filtered samples and provides corresponding QCIFx blocks 205. The QCIFx blocks 205 are each encoded by the video encoder 101, represented as an encoder 207, which outputs encoded QCIF blocks QCIF(x), which includes QCIF(1) block 120, QCIF(2) block 122, etc. The encoded QCIF(x) blocks are provided to one input of an output buffer 225, which incorporates or otherwise encapsulates the encoded QCIF(x) blocks within the bitstream BTS. The encoded QCIF(x) blocks are decoded within the video encoder 101, represented as a decoder 209, which outputs reconstructed QCIF blocks shown as RECON QCIFx blocks 211. The RECON QCIFx blocks 211 are each provided to the input of an up sampler 213, having its output coupled to the input of another LPF 215 also configured by or within the AFS 105. As further described below, the RECON QCIFx blocks 211 are also provided directly to the AFS 105 for configuring the LPF 215 for filtering the corresponding up sampled information at the output of the up sampler 213. In one embodiment, the up sampler 213 performs interpolation, in which it inserts zeros in a digital data stream, and then the digital data stream is smoothed out by the LPF 215. The output of the LPF 215 provides predictive PCIFx blocks 217, which are each combined with corresponding ones of the CIFx blocks by an adder 219 to provide residual RCIFx blocks 221. In particular, the adder 219 subtracts PCIF1 from CIF1 to provide RCIF1, subtracts PCIF2 from CIF2 to provide RCIF2, etc. The residual RCIFx blocks 221 are encoded, represented as encoder 223, which outputs encoded residual blocks RCIF(x), which includes RCIF(1) block 121, RCIF(2) block 123, etc. The output buffer 225 incorporates or otherwise encapsulates the encoded reference RCIF(x) blocks 121 into the bitsream BTS. It is noted that the encoders 207 and 223 may be implemented as a single encoder 227 as understood by those skilled in the art.

Figure 3:
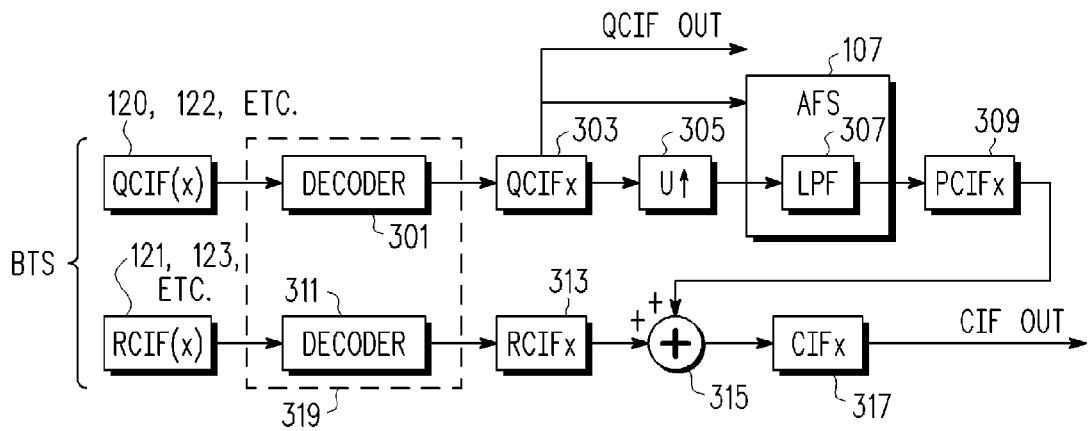
FIG. 3 is a simplified figurative block diagram illustrating the up sampling process performed by the video decoder of FIG. 1.

FIG. 3 is a simplified figurative block diagram illustrating the up sampling process performed by the video decoder 103. The QCIFx blocks (120, 122, etc.) are extracted from the bitstream BTS and provided to a decoder 301, which outputs corresponding decoded QCIFx blocks 303 as part of a QCIF video output for storage or display. The decoded QCIFx blocks 303 are also provided to the input of an up sampler 305, having its output provided to the input of an LPF 307 configured or selected within the AFS 107. The QCIFx blocks 303 are also provided directly to the AFS 107 for configuring each LPF for filtering corresponding up sampled information. The output of the LPF 307 provides prediction PCIFx blocks 309, which are provided to one input of an adder 315. The residual RCIF(x) blocks (e.g., 121, 123, etc.) are provided within the video decoder 103 to a decoder 311, which outputs corresponding residual RCIFx blocks 313 provided to the other input of the adder 315. The adder 315 adds each of the predictive PCIFx blocks 309 with a corresponding one of the residual RCIFx blocks 313 and outputs corresponding CIFx video blocks 317 for storage or display. It is noted that the decoders 301 and 311 may be implemented as a single decoder 319 as understood by those skilled in the art.

FIGS. 1-3 illustrate the use of low-pass filtering within the encoder and decoder of a scalable video processing system to perform both up and down scaling. The scalable video encoder 101 uses the LPF 201 for down sampling and the LPF 215 for up sampling and the scalable video decoder 103 uses LPF 307 following the up sampling process. It is noted that the LPF 215 and the LPF 307 are configured in substantially identical manner to avoid any mismatch between the encoder 101 and the decoder 103. As previously discussed, a fixed filter does not achieve optimum performance in anti-aliasing and anti-imaging when up or down sampling is performed. This is because the frequency content of the input video streams varies and is time-varying within a video stream. It is thus desirable to provide a scheme in which the filter length and filter performance are adaptively updated depending on the localized frequency content of the frame, slice, or macroblock of the input video frame. Another advantage of having a localized content adaptive scheme for the filter selection is that over-design of the filter is avoided for each slice in which a shorter filter may be applied, so that the computational intensity and processing power are significantly reduced. The block AFS 105 within the video encoder 101 and the AFS 107 within the video decoder 103 provide an adaptive method based on the content of the processing resolution (e.g., a tile, which holds a slice of information in which each slice is one or more macroblocks up to an entire frame of information) for selecting preconfigured low-pass filters or for programming filter taps for balancing visual quality with both power and memory consumption. FIGS. 1-3 illustrate video processing, where it is understood that the present invention applies to any image information including, for example, JPEG images and the like.

Figure 4:
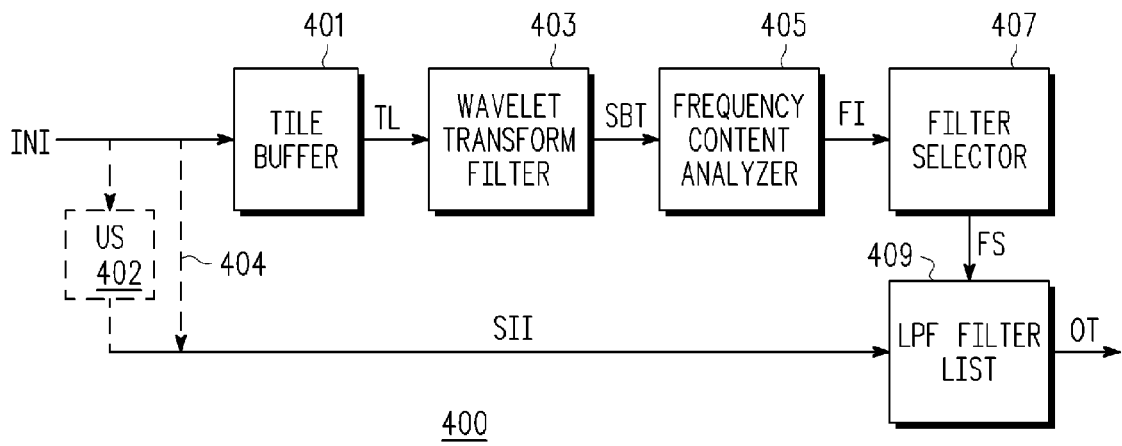
FIG. 4 is a top level block diagram of a localized content adaptive filter for scalable video processing according to an exemplary embodiment of the present invention which may be used to implement either or both of the adaptive filter systems of FIG. 1.

FIG. 4 is a top level block diagram of a localized content adaptive filter 400 for scalable video processing according to an exemplary embodiment of the present invention which may be used to implement either or both AFS 105 and AFS 107. It is noted that the localized content adaptive filter 400 is an exemplary embodiment in which the filters are designed in advance based on a statistical analysis of different video sequences with varying frequency content whose optimum filters for the tiled input are matched to threshold levels to allow the use of a mapping between the thresholds and the filters at run time. In another embodiment, as further described below, the filters are configured in real-time based on predetermined relationships. Input information (INI) (e.g., video, image, image sequence, etc.) is provided to a tile buffer 401, which facilitates the selection of a filter based on a localized frequency content an image or video frame. The INI depends upon the particular filter being implemented, such as the CIFx blocks 110, 111, etc., for the LPF 201, the RECON QCIFx blocks 211 for the LPF 215, or the QCIFx blocks 303 for the LPF 307. The tile buffer 401 breaks up the input information into tiles according to a selected processing resolution, in which the size of each tile is either a macroblock or slice, or frame, and in which each slice is one or more macroblocks depending upon system configuration and operation. Each tile TL output from the tile buffer 401 is coupled to the input of a wavelet transform filter 403. In one embodiment, the wavelet transform filter 403 is implemented as a "Haar" wavelet transform filter as known to those skilled in the art. The output of the wavelet transform filter 403 is sub-banded tile (SBT) information that facilitates the analysis of the frequency content of the selected tile in the tile buffer 401. The SBT information is provided to the input of a frequency content analyzer 405. The frequency content analyzer 405 provides a frequency indicator (FI) signal to the input of a filter selector 407, which incorporates a predetermined mapping between the FI signal and a preconfigured filter within a preconfigured bank of filters or list of filters, referred to herein as a filter list 409. The filter selector receives the FI signal and provides a frequency select (FS) signal to an input of the filter list 409, which selects one of a set of preconfigured filters for conducting low-pass filtering.

Each of the filters in the filter list 409 is preconfigured with filter coefficients placed in tabular format or the like (e.g., lookup table). The filter responses are empirically mapped to various thresholds using a large statistical sample of video sequences and/or images. The frequency content analyzer 405 determines whether most of the energy in the tile TL stored in the tile buffer 401 is mostly low or high frequency and provides the FI signal indicative thereof. If low frequency is predominant in the tile TL, a low frequency indicator output is provided to the filter selector 407. Similarly a high frequency indicator is provided if the predominant frequency is high. Once the frequency content is determined, the FI signal is mapped to the appropriate preconfigured and pre-designed low-pass filter for the purpose of assigning a sampling filter to the tile TL being processed. In one embodiment, the filter list 409 is a lookup table receiving the FS signal as a pointer which is determined by the frequency content of the tiled input image or video frame. The tabularized filters are pre-designed and optimized based on a training set of images or videos to yield high visual quality. Once a low-pass filter is selected, selected input information (SII) is provided to the input of the selected low-pass filter to provide output filtered tile data OT. The SII depends on whether the localized content adaptive filter 400 is configured for up-sampling, such as the LPF 215 or LPF 307, or down-sampling, such as the LPF 201. In the down-sampling case, the SII is the same INI provided to the input of the tile buffer 401 and also follows path 404 as the input to the filter list 409. In the up-sampling case, the SII is the up-sampled (US) image information provided by the output of the corresponding up-sampler, such as the output of the up sampler 213 for the LPF 215 or the output of the up sampler 305 for the LPF 307, shown as US 402. The US image information is associated with the tile TL in that it is the up sampled version of the INI.

It is noted that correlation is maintained between the TL information and the SII information being filtered by the filter list 409. For example, if processing on a macroblock by macroblock basis, then each macroblock of TL used to select a filter in the filter list 409 corresponds to the SII filtered by the filter list 409. In an alternative embodiment (not shown), the TL output of the tile buffer 401 is provided directly to the filter list 409 for filtering by the selected filter within the filter list 409 for the down sampling case, or to a corresponding up sampler, having its output provided to the input of the filter list 409 for filtering by the selected filter within the filter list 409.

Figure 5:
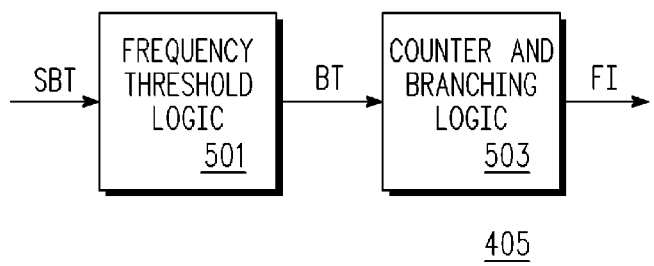
FIG. 5 is a block diagram illustrating an exemplary embodiment of the frequency content analyzer of FIG. 4.

FIG. 5 is a block diagram illustrating an exemplary embodiment of the frequency content analyzer 405. In this case, the frequency content analyzer 405 includes frequency threshold logic 501 having its input receiving the SBT information from the output of the filter bank 403, and counter and branching logic 503 providing the FI signal. The frequency threshold logic 501 binarizes each tile and outputs a binarized tile BT to the counter and branching logic 503. The particular level of the frequency threshold logic 501 is set based on average statistics of a large set of image and video sequences with variant or differing content. The counter and branching logic 503 incorporates a counter or the like which determines whether the amount of low or high frequency pixel energy in the binarized tile BT being processed at the output of the frequency threshold logic 501 is significant to determine whether the original tile TL contains primarily low or high frequency content. The counter and branching logic 503 incorporates either a multiplexer (MUX) or other multiple path branching logic (not shown), which facilitates the selection of the preconfigured filters to be used for the tile TL being processed. The counter and branching logic 503 asserts the FI signal to the filter selector 407, which provides a mapping between the FI signal and the preconfigured filters of the filter list 409 as previously described.

Figure 6:
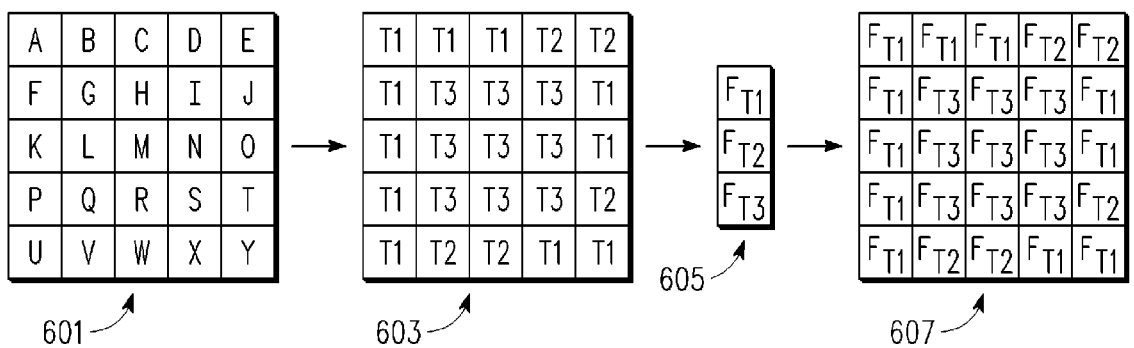
FIG. 6 is a block diagram illustrating processing of an exemplary frame using the localized content adaptive filter of FIG. 4.

FIG. 6 is a block diagram illustrating processing of an exemplary frame 601 using the localized content adaptive filter 400. The frame 601 is sub-divided into a 5×5 grid of tiles labeled A, B, C, . . . , Y. The size of each tile is one or more macroblocks depending on the size of the tile buffer 401. Each tile A-Y is provided, one by one, to the wavelet transform filter 403 and the SBT information for each tile is provided to the frequency content analyzer 405. In this case, the frequency content analyzer 405 applies threshold logic to each SBT information output in which three threshold levels T1, T2 and T3 are defined. T1 corresponds to a lower frequency range, T2 corresponds to a mid frequency range, and T3 corresponds to a higher frequency range. It is noted that any number of threshold levels and corresponding filters may be defined (more or less than three), in which three thresholds and corresponding filters are shown only as an exemplary configuration. The frame 601 is mapped according to threshold level by the frequency content analyzer 405 as represented by threshold frame 603. In particular, tiles A, B, C, F, J, K, O, P, U, X, and Y are mapped to threshold level T1, tiles D, E, T, V, and W are mapped to threshold level T2, and the remaining tiles G, H, I, L, M, N, Q, R, and S are mapped to threshold level T3. As shown, the threshold frame 603 is a 5×5 grid illustrating the mapping of each of the tiles A-Y with a corresponding one of the threshold levels T1-T3.

Figure 9:
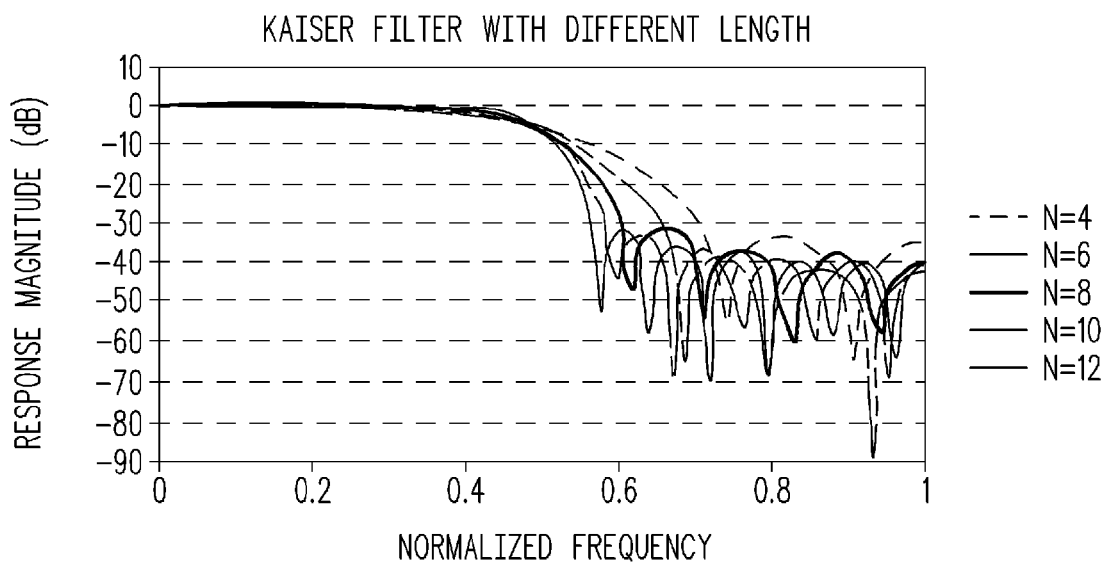
FIG. 9 is a graph diagram of the adaptive length Kaiser-Bessel filter described in Table 2 plotting the response magnitude in dB versus normalized frequency for each tap number N in which the re-sampling ratio is 2.

A filter list 605 is shown with three filters $F_{T1}$, $F_{T2}$ and $F_{T3}$ having filter orders $N_{T1}$, $N_{T2}$ and $N_{T3}$, respectively, in which "N" denotes the filter order and the subscript of the filter F and filter order N corresponding to the particular threshold level. Thus, the filter $F_{T3}$ is the low-pass re-sampling filter corresponding or mapped to threshold level T3, the filter $F_{T2}$ is the low-pass re-sampling filter corresponding or mapped to threshold level T2, and the filter $F_{T1}$ is the low-pass re-sampling filter corresponding or mapped to threshold level T1. The threshold frame 603 is mapped according to the selected filter of the filter list 605 by the frequency selector 407 as represented by a filter frame 607. As shown, the filter frame 607 is a 5×5 grid illustrating the mapping of each of the tiles A-Y with a corresponding one of the filters $F_{T1}$-$F_{T3}$ according to the particular threshold level T1-T3 assigned to that tile. In particular, tiles A, B, C, F, J, K, O, P, U, X, and Y are mapped to filter $F_{T1}$, tiles D, E, T, V, and W are mapped to filter $F_{T2}$, and the remaining tiles G, H, I, L, M, N, Q, R, and S are mapped to filter $F_{T3}$. As understood by those skilled in the art, the greater the filter order N of the filter F, the better anti-alias and anti-imaging (as shown in FIG. 9), as this implies a sharper transition bandwidth and higher attenuation past the filter cutoff frequency. Depending on the logic selected for the threshold, the designer establishes the relationship between the magnitude of the threshold and the filter to be selected. In this exemplary embodiment, it is desired to reduce the attenuation of the higher frequencies of the tiles that are mapped to the higher thresholds. In this manner, it is concluded that the filter orders $N_{T1}$-$N_{T3}$ of the corresponding filters $F_{T1}$-$F_{T3}$, respectively, have the relationship $N_{T1} > N_{T2} > N_{T3}$. It is further noted that the larger the number of threshold levels and corresponding low-pass filters that are defined, the better the expected encoding performance both subjectively and objectively. Although only three threshold levels T1-T3 and corresponding filters $F_{T1}$-$F_{T3}$ are shown in FIG. 6, where it is understood that any number of threshold levels and corresponding low-pass filters may be defined depending upon the particular configuration and system needs.

As an example, if 601 represents a frame of the input video to be processed by the video encoder 101 using the localized content adaptive filter 400 as the AFS 105, then each tile A-Y is loaded into the tile buffer 401 and processed by the wavelet transform or filter bank 403 and the frequency content analyzer 405, one by one, in which the filter selector 407 selects the appropriate low-pass filter stored the filter list 409 for processing the corresponding tile. Assuming the threshold levels T1, T2 and T3 and the filter list 605 (representing the pre-configured filter list 409), the filter selector 407 selects one of the filters in the filter list 409, $F_{T1}$, $F_{T2}$, or $F_{T3}$ based on input signal FI which provides an indication of the mapping of threshold levels to the filters in the filter list 409. Assuming tile A results in a mapping of T1 to $F_{T1}$, then tile A is applied to the input of filter $F_{T1}$ serving as the LPF 201. The filtered output of filter $F_{T1}$ is then applied to the down sampler 203 and processed through the video encoder 101 as previously described.

If frame 601 instead represents the RECON QCIFx blocks 211 of the video encoder 101, then the localized content adaptive filter 400 represents the AFS 105 and is used to select the LPF 215. In this case, the tiles A-Y represent the output from the decoder 209. Reconstructed QCIF tile A is processed through the localized content adaptive filter 400 for selecting the filter $F_{T1}$ in substantially identical manner as described above. In this case, however, tile A is provided to the input of the up sampler 213 and the output of the up sampler 213 is provided to the selected filter $F_{T1}$ (i.e., rather than the output of the up sampler 213 being processed through the localized content adaptive filter 400). Thus, each tile is processed in parallel through the localized content adaptive filter 400 and the up sampler 213, in which the output of the up sampler 213 is applied to the input of the selected filter. In a similar manner, if frame 601 represents the QCIFx blocks 303 of the video decoder 103, then the filters of the filter list 605 are selected in substantially identical manner and the tiles A-Y are processed one by one through the up sampler 305 and then through the selected low-pass filter implementing the LPF 307.

It was previously noted that the LPF 215 of the AFS 105 within the encoder 101 should be configured in substantially identical manner as the LPF 307 of the AFS 107 within the decoder 103. It is further noted that the up samplers 213 and 305 be configured to operation in substantially identical manner. In an alternative embodiment, the encoder 101 is configured to incorporate information of the selected filter for the LPF 215 within the bitstream BTS so that the AFS 107 of the decoder 103 selects the same filter for the LPF 307. In this alternative configuration, the AFS 107 need not be configured with all of the functionality of the localized content adaptive filter 400 but instead include only the filter list 409 and sufficient logic to retrieve the selected filter information from the bitstream BTS and to generate the FS signal provided to the filter list 409 for selecting the appropriate filter. A potential benefit of this alternative configuration is that it ensures that the filters 215 and 307 are the same. This alternative configuration may change any standard definition describing the bitstream BTS since additional information is incorporated to identify selected filters. Also, the alternative configuration may increase the bit rate of the bitstream BTS if additional bits are needed for the additional information, although it may be possible to re-define existing bits or use currently unused or undefined bit combinations.

Figure 7:
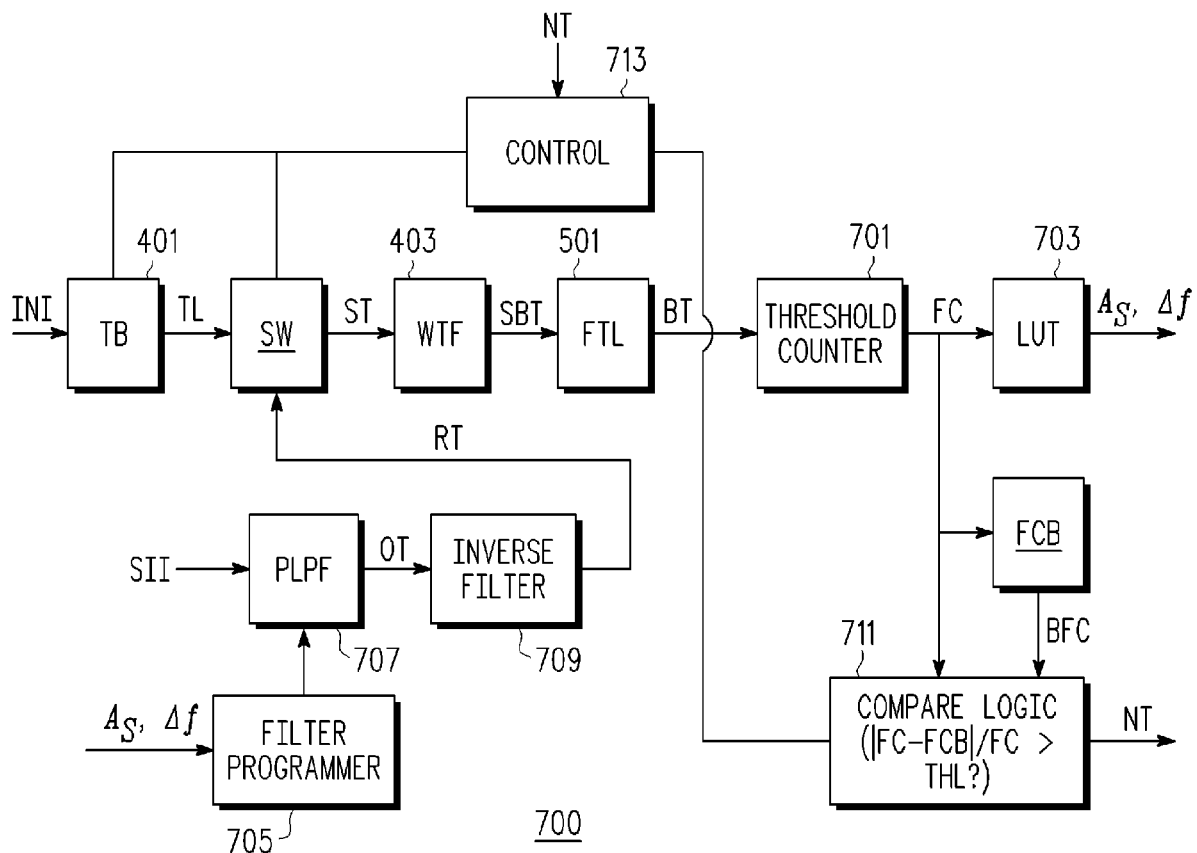
FIG. 7 is a top level block diagram of a localized content adaptive filter for scalable video processing according to another exemplary embodiment of the present invention which may be used to implement either or both of the adaptive filter systems of FIG. 1.

FIG. 7 is a top level block diagram of a localized content adaptive filter 700 for scalable video processing according to another exemplary embodiment of the present invention which may be used to implement either or both AFS 105 and 107. In this case, the low-pass filters are not preconfigured but are configured or otherwise programmed during run time (or in real time) as the tiles from the tile buffer 401 are being processed. The localized content adaptive filter 700 may yield superior results since the designer has the flexibility to adjust the filter response in a more accurate manner as compared to pre-configured filters. It is understood, however, that the localized content adaptive filter 700 is suitable for those applications in which sufficient power is available since it potentially consumes more power than a preconfigured filter system, such as the localized content adaptive filter 400. As known to those skilled in the art of filter design, filter window functions are relatively easy to implement and provide a suitable technique for the reduction of Gibb's oscillations. The window functions operate to smooth the signal so that the resulting spectrum is more band-limited thereby reducing spectral leakage. A number of different window functions may be used, such as, for example, the rectangular window, the triangular window (e.g., Bartlett), the raised-cosine or cosine-squared windows (e.g., Hann), the Hamming window, the Blackman window, the Kaiser-Bessel window, etc. A suitable window function is selected depending upon the relative amount of reduction in the amplitude of the Gibb's oscillations, the implementation complexity, and the actual application of the filter during video processing. The localized content adaptive filter 700 is illustrated using the Kaiser-Bessel window function, where it is understood that alternative window functions may be employed depending upon the particular configuration.

The localized content adaptive filter 700 includes the tile buffer 401 storing the current tile TL, the wavelet transform filter 403, and the frequency threshold logic 501, which operate in a similar manner as described previously with respect to the localized content adaptive filter 400. In this case, the output tile TL of from the tile buffer 401 is provided to one input of switch logic SW, which also receives a recovered tile RT at its other input. The recovered tile RT is described further below. The switch logic SW selects between the original tile TL and the recovered tile RT and outputs a selected tile ST to the input of the wavelet transform filter 403, having its output provided to the frequency threshold logic (FTL) 501. The binarized output BT of the frequency threshold logic 501 is provided to a threshold counter 701, which outputs a frequency count value FC to a lookup table (LUT) 703. The LUT 703 maps each FC value into transition bandwidth values $\Delta f$ and corresponding stopband attenuation values $A_S$. Each transition bandwidth value $\Delta f$ is related to radial transition bandwidth according to the equation $\Delta f = \Delta w / 2\pi$ as known to those skilled in the art of filter design. The transition bandwidth value $\Delta f$ and corresponding stopband attenuation value $A_S$ are provided to a filter programmer 705, which programs a programmable low-pass filter (PLPF) 707. The PLPF 707, after being programmed for the particular tile being processed, filters the selected input information SII from either the INI (for the down sampled case) or the up sampled US version of the INI (for the up sampled case) as previously described, where the PLPF 707 provides the output filtered tile data OT.

In the illustrated configuration, the filter programmer 705 and the PLPF 707 are implemented according to a Kaiser-Bessel window function, although other windowing functions are contemplated. The Kaiser-Bessel window function is used as an example of how the filter response is varied or programmed as a function of the filter order N, the stopband attenuation $A_S$, and the transition bandwidth $\Delta f$. The Kaiser-Bessel window function, represented as w(k), is a family of windows spanned by a beta parameter $\beta$, which offers a systematic method of obtaining a suitable tradeoff between the transition bandwidth and the stopband attenuation. The beta parameter $\beta$ is adjusted according to the stopband attenuation $A_S$, such as, for example, according to the following equation (1):

$$\beta = \begin{cases} 0 & \text{if}\_A_S < 21 \\ 0.5842(A_S - 21)^{0.4} + & \\ 0.07886(A_S - 21) & \text{if}\_21 < A_S < 50 \\ 0.1102(A_S - 8.7) & \text{if}\_A_S > 50 \end{cases} \quad (1)$$

The Kaiser-Bessel window function w(k) is a function of the beta parameter $\beta$ and the filter order N according to the following equation (2):

$$w(k) = \frac{I_0\left[\beta\sqrt{1 - (2k/(N-1))^2}\right]}{I_0[\beta]} \text{ for } -\frac{N-1}{2} \le k \le \frac{N-1}{2} \quad (2)$$

in which $I_0[x]$ is the modified zeroeth order Bessel function, expressed according to the following equation (3):

$$I_0[x] = 1 + \sum_{k=1}^{K}\left[\frac{(0.5x)^k}{k!}\right]^2 \quad (3)$$

where only a reduced number of terms (e.g., K=20 terms) in the summation of equation (3) need be calculated in most practical filter designs. Also, the filter order N may be estimated based on the stopband attenuation and the transition bandwidth according to the following equation (4):

$$N \approx \frac{A_S - 7.95}{14.36\Delta f} \quad (4)$$

It is evident from the relationships described in the above equations (1)-(4) that for those applications in which the PLPF 707 is configured at run time, the mapping between threshold values of each tile TL and the transition bandwidth $\Delta f$ and the stopband attenuation $A_S$ yields a Kaiser-Bessel window function w(k) and subsequently a low-pass filter design that is associated to the FC value of the tile TL being processed. The mapping between the FC values and the values of $\Delta f$ and $A_S$ is predetermined based on a statistical analysis of several input video sequences and/or images and the visual quality at the output after a filter is applied. After the PLPF 707 is programmed, it filters the SII (either INI or the up sampled version thereof) and provides output filtered tile data OT.

Because the video sequence or image to be processed in an actual configuration may have slight deviations for the ones tested, it is desirable to have an adaptive process whereby a more optimal filter is applied to each tile instead of the default one implied by the predetermined mappings of FC with $\Delta f$ and $A_S$ provided within the LUT 703. The output filtered tile data OT of the PLPF 707 is provided to an inverse filter 709, which effectively performs a reverse filter function as the PLPF 707, and generates the recovered tile RT. The recovered tile RT is then provided to the other input of the switch logic SW. For one or more iterations after the tile TL is selected, the switch logic SW is switched to select RT as the selected tile ST, so that the recovered tile RT is processed through the wavelet transform filter 403, the frequency threshold logic 501 and the threshold counter 701 instead of the original tile TL for the subsequent iterations associated with the tile TL. In each subsequent iteration, the threshold counter 701 generates a new frequency count value FC at its output for the recovered tile RT. A frequency count buffer FCB is provided having an input receiving FC and an output providing a buffered FC value shown as a BFC value. Thus, the buffer FCB stores the original FC value as the BFC value, and the new FC value and the BFC value are provided to respective inputs of compare logic 711. The compare logic 711 compares FC with BFC, and if the FC differs from the BFC by less than a predetermined threshold level TL (e.g., a percentage difference or the like, such as 15%), then processing for the current tile TL is complete and the compare logic 711 asserts a next tile flag NT. The NT flag denotes successful filtering so that the next tile in the video data stream may be loaded into the tile buffer 401 and the flag NT is cleared. Control logic 713 is shown coupled to the tile buffer 401, the switch logic SW and the compare logic 711 and receives the NT flag for controlling the recursive process.

If the difference between FC and BFC is greater than the threshold level THL, then NT remains false the new FC is stored into FDB and also provided to lookup table 703 to map new values of $\Delta f$ and $A_S$. The new values of $\Delta f$ and $A_S$ are provided to the filter programmer 705, which reprograms the PLPF 707 to generate new output filtered tile data OT. The new output filtered tile data OT is provided through switch logic SW and processed in similar manner to generate another FC value which is compared with the previous FC value, stored as BFC. The process is repeated for as many iterations as necessary (up to a predetermined maximum number of iterations) until FC converges to within the predetermined threshold level THL of BFC. In this manner, the localized content adaptive filter 700 is designed to perform a recursive process for converging the frequency count value FC to determine output filtered tile data OT for each tile of the video data being processed. As note above, in the first iteration the switch logic SW selects the tile TL stored in the tile buffer 401, and then during each subsequent iteration, the switch logic SW selects the recovered tile RT until the NT flag is asserted or until the predetermined maximum number of iterations is reached (with or without success) as determined by the control logic 713. The buffer FCB stores each FC value from the threshold counter 701 as the previous FC value (BFC) for comparison with the next FC value generated so that each consecutive pair of FC values may be compared with each other by the compare logic 711 for evaluating the recursive process. The predetermined maximum number of iterations is determined by a tradeoff of complexity level and minimization of error in the frequency count threshold (e.g., minimum deviation to frequency content/energy).

Since image re-sampling is normally done in a horizontal and vertical separable 2-D filtering and the two 1-D filters are identical, here exemplary 1-D filters are listed. The following Table 1 lists five exemplary $\beta$ values ranging from 1.5 to 5.5 and corresponding filter tap values for each of four taps for a fixed length Kaiser-Bessel up sampling filter of N=4 and in which the re-sampling ratio is 2:

TABLE 1

Beta and Tap Values For 4-Tap Kaiser-Bessel Filter

| Beta Values | Filter Tap Values |
| --- | --- |
| 1.5 | [−5, 21, 21, −5]/32 |
| 2.5 | [−4, 20, 20, −4]/32 |
| 3.5 | [−3, 19, 19, −3]/32 |
| 4.5 | [−2, 18, 18, −2]/32 |
| 5.5 | [−1, 17, 17, −1]/32 |

Figure 8:
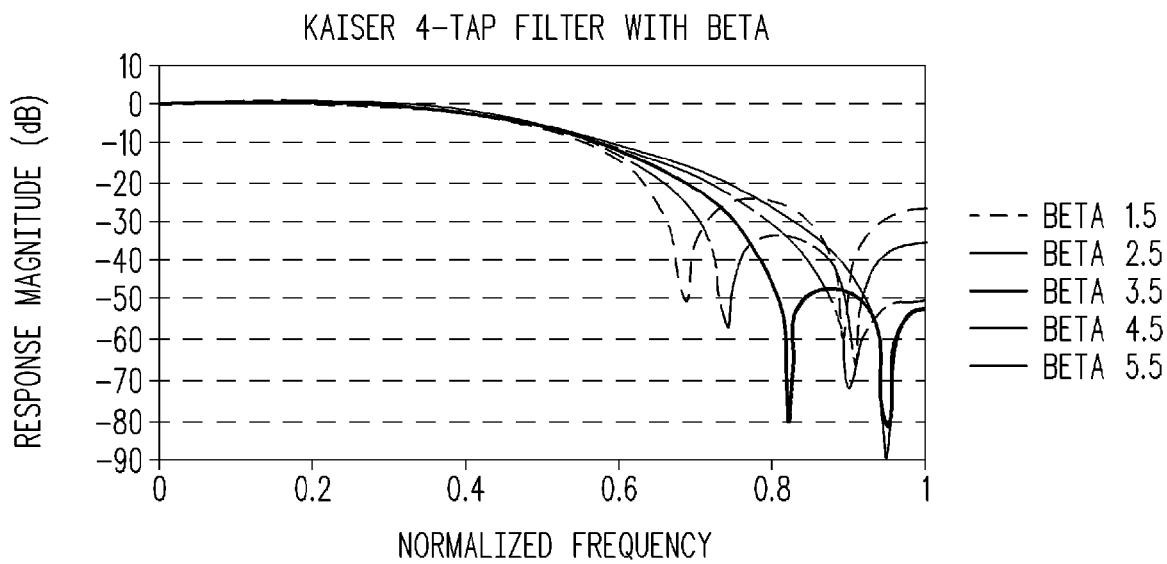
FIG. 8 is a graph diagram of the 4-Tap Kaiser-Bessel filter described in Table 1 plotting the response magnitude in decibels (dB) versus normalized frequency for each of the exemplary $\beta$ values in which the re-sampling ratio is 2.

FIG. 8 is a graph diagram of the 4-Tap Kaiser-Bessel filter described in Table 1 plotting the response magnitude in decibels (dB) versus normalized frequency for each of the exemplary $\beta$ values in which the re-sampling ratio is 2. The graph diagram of FIG. 8 illustrates that the larger the $\beta$ value for a given filter length, the less attenuated the high frequency content. The lower $\beta$ values provide increased attenuation of the higher frequencies. The following Table 2 lists the number of taps ranging from 4 to 12 and corresponding filter tap values for an adaptive length Kaiser-Bessel up sampling filter and in which the re-sampling ratio is 2:

TABLE 2

Tap Number and Tap Values For Adaptive Length Kaiser-Bessel Filter

| N | Filter Tap Values |
| --- | --- |
| 4 | [−4, 20, 20, −4]/32 |
| 6 | [1, −5, 20, 20, −5, 1]/32 |
| 8 | [−1, 3, −6, 20, 20, −6, 3, −1]/32 |
| 10 | [1, −2, 3, −6, 20, 20, −6, 3, −2, −1]/32 |
| 12 | [−1, 1, −2, 43, −6, 20, 20, −6, 43, 1, −1]/32 |

FIG. 9 is a graph diagram of the adaptive length Kaiser-Bessel filter described in Table 2 plotting the response magnitude in dB versus normalized frequency for each tap number N in which the re-sampling ratio is 2. The graph diagram of FIG. 9 illustrates that the larger the number of taps, the more attenuated the high frequency content. The higher number of taps increases the attenuation of the higher frequencies.

A localized content adaptive filter system according to an embodiment of the present invention includes a tile buffer having an output providing first image information, a frequency analyzer providing a frequency information signal based on frequency content of the first image information, and an adaptive filter which is adjusted based on the frequency information signal.

In one embodiment, the frequency analyzer includes a wavelet transform filter and a frequency content analyzer providing the frequency information signal, and the adaptive filter includes filter select logic having a first input receiving the frequency information signal, a second input receiving second image information associated with the first image information, and an output providing filtered image information. The filter select logic determines a filter based on the frequency information signal and the determined filter filters the second image information to provide the filtered image information.

The filter select logic may include a filter selector and a filter list. The filter selector receives the frequency information signal and provides a filter select signal. The filter list receives the filter select signal and the second image information and provides the filtered image information. The filter list includes a list of preconfigured filters in which one filter is selected by the filter select signal for filtering the second image information. The preconfigured filters may be mapped to multiple thresholds which have been determined based on predetermined image information.

The wavelet transform filter may be a Haar wavelet transform filter. The frequency content analyzer may be configured to determine the relative energy of the first image information between a lower frequency range and a higher frequency range. The frequency content analyzer may include frequency threshold logic and counter logic providing the frequency information signal. In this case, the wavelet transform filter provides sub-banded image information, the frequency threshold logic binarizes the image information based on at least one frequency threshold level and provides binarized information, and the counter logic counts the binarized information to determine relative frequency information.

In yet another embodiment, the frequency content analyzer may include frequency threshold logic and a threshold counter having an output providing a corresponding one of multiple frequency count values. In this case, the filter select logic includes a programmable filter system that is programmed based on the corresponding frequency count value. The programmable filter system may further include a memory and a programmable filter. The memory stores frequency transition bandwidth values and corresponding stopband attenuation values. Each frequency count value is mapped to a corresponding filter value pair in which each filter value pair includes one each of the frequency transition bandwidth values and the stopband attenuation values. The programmable filter is programmed based on a selected filter value pair. The programmable filter may be configured according to a predetermined filter window function.

The localized content adaptive filter system may further include an inverse filter receiving the filtered image information and providing reconstructed image information, control logic which provides the reconstructed image information through the wavelet transform filter and the frequency content analyzer to provide a new frequency count value for each of one or more iterations, and comparator logic which determines whether consecutive frequency count values are within a predetermined range of each other.

The localized content adaptive filter system may be configured for down-sampling in which the second image information to be filtered is the first image information provided to an input of the tile buffer. In an up-sampled configuration, the first image information is first up-sampled before being filtered by a selected or programmed filter.

An image processing system according to an embodiment of the present invention includes an up sampler and a localized content adaptive filter. The up sampler has an input receiving first image information at a first spatial layer and an output providing up sampled image information. The localized content adaptive filter may include a tile buffer which stores the first image information, a wavelet transform filter having an input coupled to the tile buffer and an output, a frequency content analyzer having an input coupled to the output of the first wavelet transform filter and an output providing a frequency information signal indicative of frequency content of the first image information, and filter select logic having a first input receiving the frequency information signal, a second input receiving the up sampled image information, and an output providing first filtered image information for a second spatial layer. In this case, the filter select logic determines a filter based on the frequency information signal and the determined filter filters the up sampled image information to provide the filtered image information.

In one embodiment, the image processing system is configured for a decoder. In this case, the system includes a decoder and an adder. The decoder has an input receiving encoded image information at the first spatial layer and encoded residual information at the second spatial layer, and an output providing the first image information at the first spatial layer and residual information at the second spatial layer. The adder has a first input receiving the first filtered image information, a second input receiving the residual information and an output providing second image information at the second spatial layer.

In an alternative embodiment, the image processing system is configured for an encoder. In this case, the system includes a second localized content adaptive filter configured in a similar manner as the first localized content adaptive filter and a down sampler. The second localized content adaptive filter includes another tile buffer storing second image information at the second spatial layer. The second filter includes another frequency content analyzer which provides a second frequency information signal indicative of frequency content of the second image information. The second filter includes second select logic having inputs receiving the second frequency information signal and second image information and an output providing second filtered image information for the first spatial layer. In this case, the filter select logic of the second filter determines a second filter based on the second frequency information signal which filters the second image information to provide the second filtered image information. The down sampler has an input receiving the second filtered image information and an output providing third image information at the first spatial layer.

The encoder system may further include an encoder, a decoder and an adder. The encoder has an input receiving the third image information and residual image information at the second layer and an output providing first encoded image information at the first spatial layer and encoded residual information at the second spatial layer. The decoder has an input receiving the first encoded image information and an output providing the first image information at the first spatial layer. The adder has a first input receiving the first filtered image information, a second input receiving the second image information, and an output providing the residual image information. The encoder system may further include an output buffer which combines the first encoded image information at the first spatial layer and the encoded residual information at the second spatial layer into a bitstream.

The frequency content analyzer of each localized content adaptive filter may include frequency threshold logic and counter logic providing a frequency information signal. Also, the filter select logic may include a filter selector and a filter list. The filter selector has an input receiving the frequency information signal and an output providing a filter select signal. The filter list has a first input receiving the filter select signal, a second input receiving the up sampled image information and an output providing the filtered image information. The filter list includes preconfigured filters in which one filter is selected by the filter select signal for filtering the up sampled image information. Alternatively, the frequency content analyzer may include frequency threshold logic and a threshold counter providing a corresponding frequency count value. The filter select logic includes a programmable filter system that is programmed based on a corresponding frequency count value.

A method of adaptively configuring a filter according to an embodiment of the present invention includes localizing input image information, determining frequency content of the localized input image information, and adjusting an adaptive filter based on the determined frequency content. The method may include transforming the localized input image information through a filter bank providing filtered information and analyzing frequency of the filtered information. The method may include selecting a filter from a filter list. The method may include programming the adaptive filter according to a predetermined filter window function.

Although the present invention has been described in considerable detail with reference to certain preferred versions thereof, other versions and variations are possible and contemplated. For example, circuits or logic blocks described herein may be implemented as discrete circuitry or integrated circuitry or software or any alternative configurations. Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

The invention claimed is:

1. A localized content adaptive filter system, comprising:
a tile buffer having an output providing first image information;
a frequency analyzer, coupled to said tile buffer, providing a frequency information signal based on frequency content of said first image information;
an adaptive filter, coupled to said frequency analyzer, which is adjusted based on said frequency information signal; and
a sampler, coupled to said adaptive filter, wherein said adaptive filter and said sampler collectively modify spatial resolution of second image information.

2. The localized content adaptive filter system of claim 1, wherein:
said frequency analyzer comprises:
a wavelet transform filter having an input coupled to said output of said tile buffer and an output; and
a frequency content analyzer having an input coupled to said output of said wavelet transform filter and an output providing said frequency information signal; and
wherein said adaptive filter comprises filter select logic having a first input receiving said frequency information signal, a second input receiving said second image information associated with said first image information, and an output providing filtered image information, and wherein said filter select logic determines a filter based on said frequency information signal and wherein said determined filter filters said second image information to provide said filtered image information.

3. The localized content adaptive filter system of claim 2, wherein said filter select logic comprises:
a filter selector having an input receiving said frequency information signal and an output providing a filter select signal; and
a filter list having a first input receiving said filter select signal, a second input receiving said second image information and an output providing said filtered image information, wherein said filter list comprises a plurality of preconfigured filters in which one filter is selected by said filter select signal for filtering said second image information.

4. The localized content adaptive filter system of claim 3, wherein said plurality of preconfigured filters are mapped to a plurality of thresholds which have been determined based on predetermined image information.

5. The localized content adaptive filter system of claim 2, wherein said wavelet transform filter comprises a Haar wavelet transform filter.

6. The localized content adaptive filter system of claim 2, wherein said frequency content analyzer determines relative energy of said first image information between a lower frequency range and a higher frequency range.

7. The localized content adaptive filter system of claim 2, wherein said frequency content analyzer comprises:
frequency threshold logic having an input coupled to said output of said wavelet transform filter and an output;
counter logic having an input coupled to said output of said frequency threshold logic and an output providing said frequency information signal;
wherein said wavelet transform filter provides sub-banded image information, wherein said frequency threshold logic binarizes said image information based on at least one frequency threshold level and provides binarized information, and wherein said counter logic counts said binarized information to determine relative frequency information.

8. The localized content adaptive filter system of claim 2, wherein:
said frequency content analyzer comprises:
frequency threshold logic having an input coupled to said output of said wavelet transform filter and an output; and
a threshold counter having an input coupled to said output of said frequency threshold logic and an output providing a corresponding one of a plurality of frequency count values; and
wherein said filter select logic comprises a programmable filter system that is programmed based on said corresponding one of said plurality of frequency count values.

9. The localized content adaptive filter system of claim 8, wherein said programmable filter system comprises:
a memory storing a plurality of frequency transition bandwidth values and a corresponding plurality of stopband attenuation values, wherein each of said plurality of frequency count values is mapped to a corresponding one of a plurality of filter value pairs in which each filter value pair comprises one each of said plurality of frequency transition bandwidth values and said plurality of stopband attenuation values; and
a programmable filter which is programmed based on a selected one of said plurality of filter value pairs.

10. The localized content adaptive filter system of claim 9, wherein said programmable filter is configured according to a predetermined filter window function.

11. The localized content adaptive filter system of claim 8, further comprising:
an inverse filter having an input receiving said filtered image information and an output providing reconstructed image information;
control logic which provides said reconstructed image information through said wavelet transform filter and said frequency content analyzer to provide a new frequency count value for each of at least one iteration; and
comparator logic which determines whether consecutive frequency count values are within a predetermined range of each other.

12. The localized content adaptive filter system of claim 1, wherein said second image information is provided to an input of said tile buffer.

13. An image processing system, comprising:
an up sampler having an input receiving first image information at a first spatial layer and an output providing up sampled image information; and
a first localized content adaptive filter, comprising:
a first tile buffer which stores said first image information;
a first wavelet transform filter having an input coupled to said first tile buffer and an output;
a first frequency content analyzer having an input coupled to said output of said first wavelet transform filter and an output providing a first frequency information signal indicative of frequency content of said first image information; and
first filter select logic having a first input receiving said first frequency information signal, a second input receiving said up sampled image information, and an output providing first filtered image information for a second spatial layer;
wherein said first filter select logic determines a first filter based on said first frequency information signal and wherein said first filter filters said up sampled image information to provide said first filtered image information.

14. The image processing system of claim 13, further comprising:
a decoder having an input receiving encoded image information at said first spatial layer and encoded residual information at said second spatial layer, and an output providing said first image information at said first spatial layer and residual information at said second spatial layer; and
an adder having a first input receiving said first filtered image information, a second input receiving said residual information and an output providing second image information at said second spatial layer.

15. The image processing system of claim 13, further comprising:
a second localized content adaptive filter, comprising:
a second tile buffer which stores second image information at said second spatial layer;
a wavelet transform filter having an input coupled to said second tile buffer and an output;
a second frequency content analyzer having an input coupled to said output of said second wavelet transform filter and an output providing a second frequency information signal indicative of frequency content of said second image information; and
second select logic having a first input receiving said second frequency information signal, a second input receiving said second image information, and an output providing second filtered image information for said first spatial layer;
wherein said filter select logic determines a second filter based on said second frequency information signal and wherein said second filter filters said second image information to provide said second filtered image information; and
a down sampler having an input receiving said second filtered image information and an output providing third image information at said first spatial layer.

16. The image processing system of claim 15, further comprising:
an encoder having an input receiving said third image information and residual image information at said second layer and an output providing first encoded image information at said first spatial layer and encoded residual information at said second spatial layer;
a decoder having an input receiving said first encoded image information and an output providing said first image information at said first spatial layer; and
an adder having a first input receiving said first filtered image information, a second input receiving said second image information, and an output providing said residual image information.

17. The image processing system of claim 16, further comprising an output buffer which combines said first encoded image information at said first spatial layer and said encoded residual information at said second spatial layer into a bitstream.

18. The image processing system of claim 13, wherein said first frequency content analyzer comprises:
frequency threshold logic having an input coupled to said output of said first wavelet transform filter and an output; and
counter logic having an input coupled to said output of said frequency threshold logic and an output providing said first frequency information signal.

19. The image processing system of claim 13, wherein said first filter select logic comprises:
a filter selector having an input receiving said first frequency information signal and an output providing a filter select signal; and
a filter list having a first input receiving said filter select signal, a second input receiving said up sampled image information and an output providing said first filtered image information, wherein said filter list comprises a plurality of preconfigured filters in which one filter is selected by said filter select signal for filtering said up sampled image information.

20. The image processing system of claim 13, wherein:
said first frequency content analyzer comprises:
frequency threshold logic having an input coupled to said output of said first wavelet transform filter and an output; and
a threshold counter having an input coupled to said output of said frequency threshold logic and an output providing a corresponding one of a plurality of frequency count values; and
wherein said first filter select logic comprises a programmable filter system that is programmed based on said corresponding one of said plurality of frequency count values.

21. A method of adaptively configuring a filter, comprising:
localizing input image information;
determining frequency content of the localized input image information;
adjusting an adaptive filter based on the determined frequency content; and
sampling and filtering the input image information using the adaptive filter to change spatial resolution of the input image information.

22. The method of claim 21, wherein said determining frequency content comprises transforming the localized input image information through a filter bank providing filtered information and analyzing frequency of the filtered information.

23. The method of claim 21, wherein said adjusting an adaptive filter comprises selecting a filter from a filter list.

24. The method of claim 21, wherein said adjusting an adaptive filter comprises programming the adaptive filter according to a predetermined filter window function.

* * * * *